United States Patent [19]

Boone et al.

[11] Patent Number: 4,935,994

[45] Date of Patent: Jun. 26, 1990

[54] FREE RUNNING CINCHING SEAT BELT LATCHPLATE

[75] Inventors: Marion C. Boone, Oak Park; Fred Daris, Sterling Heights; Douglas J. Inch, Gibraltar, all of Mich.

[73] Assignee: Chrysler Corporation, Highland Park, Mich.

[21] Appl. No.: 448,383

[22] Filed: Dec. 11, 1989

[51] Int. Cl.$^5$ .................. A44B 11/10; B60R 21/10
[52] U.S. Cl. .......................... 24/196; 24/171; 280/801; 297/483
[58] Field of Search .................. 24/196, 171, 68 CD, 24/685 B, 638, 637; 280/801, 807; 297/483

[56] References Cited

U.S. PATENT DOCUMENTS

| | | | |
|---|---|---|---|
| 939,394 | 11/1909 | Cohen | 24/171 |
| 2,219,537 | 10/1940 | White | 24/196 |
| 3,982,769 | 9/1976 | Farlind | 297/483 |
| 4,294,467 | 10/1981 | Frantom | 24/171 |
| 4,848,794 | 7/1989 | Mader et al. | 280/801 |

Primary Examiner—Victor N. Sakran
Attorney, Agent, or Firm—Edward P. Barthel

[57] ABSTRACT

A seat belt latchplate is disclosed for use in association with a three-point seat belt harness wherein the latchplate is mounted at an intermediate point on the belt formed with a tongue portion adapted to be releasably anchored to an associated releasable buckle positioned inboard of the vehicle passenger seat. The latchplate has a trough-shaped depression providing a cross bar defined by a pair of symmetrically disposed belt slots located in each sloped side of the depression. A J-shaped lock bar is supported on the cross bar enabling the belt to be weaved through one slot and over the lock bar for passage through the other slot. With the latchplate in its free running stowed mode the belt is straight allowing the lock bar to float for free sliding travel of the belt through the latchplate slots. In its latched mode the belt is pulled around a hook-shaped portion of the lock bar causing the bar to rock and pinch the belt in its cinching mode releasably locking the passenger in the vehicle seat.

1 Claim, 2 Drawing Sheets

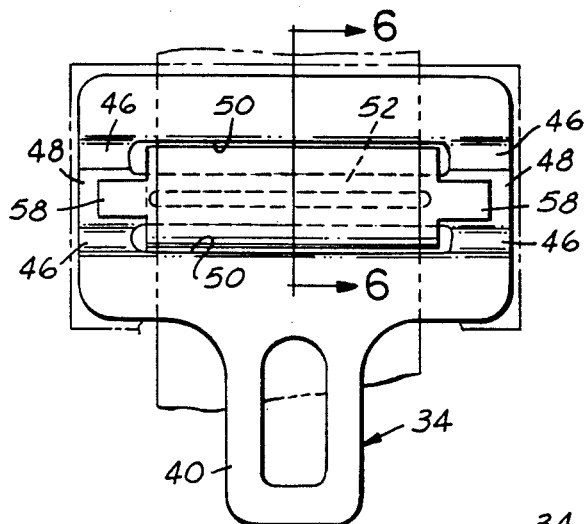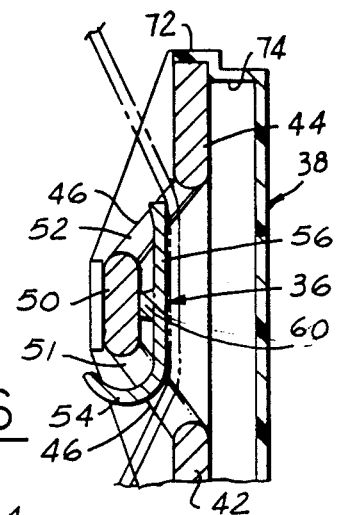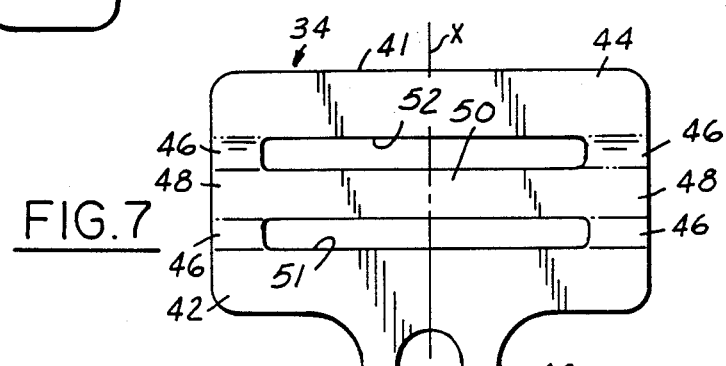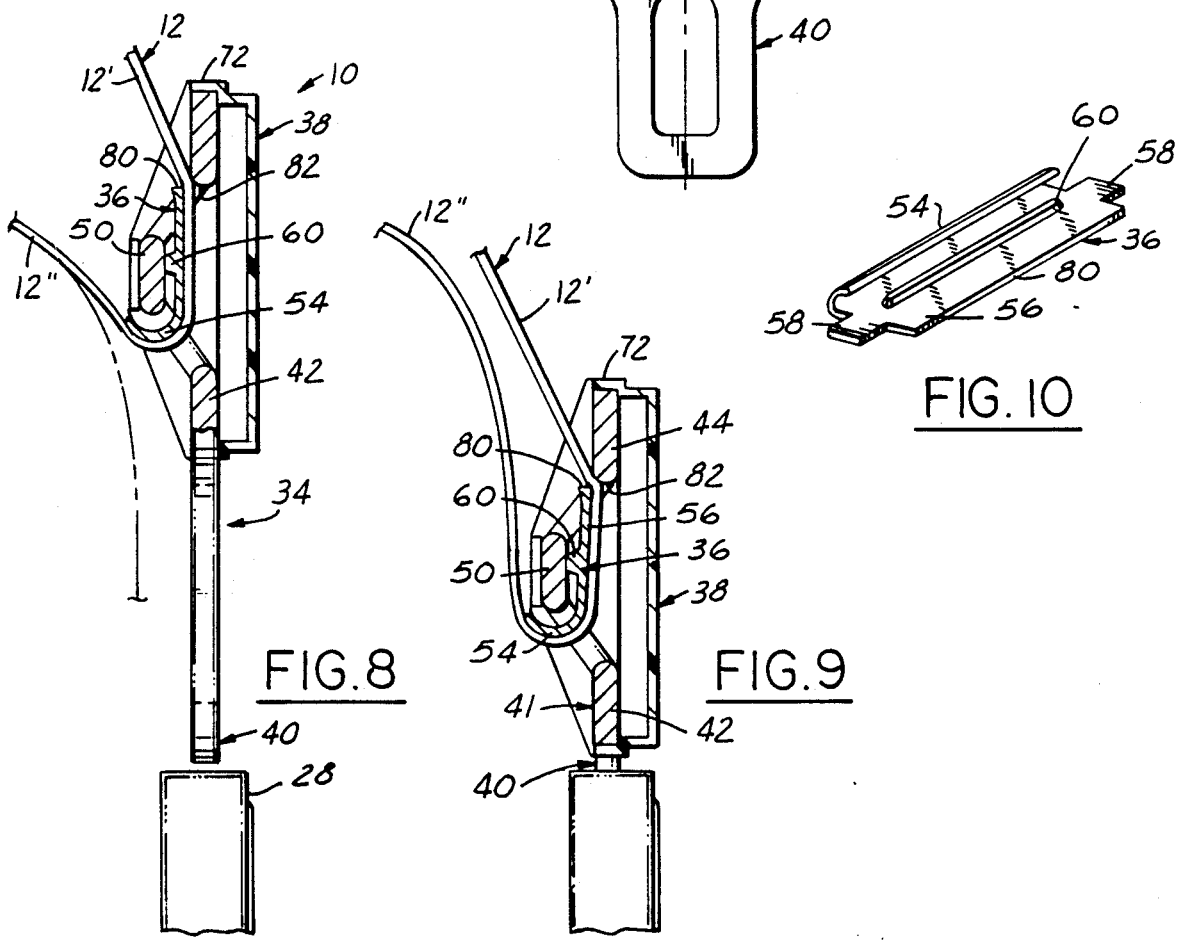

FREE RUNNING CINCHING SEAT BELT LATCHPLATE

BACKGROUND OF THE INVENTION

This invention relates generally to a three-point safety belt harness for automotive vehicles and more particularly to a latchplate suspended on the continuous belt having two of the anchor points and which is anchored to a third anchor.

One example of a prior art free falling or free running cinching connector is disclosed in the U.S. Pat. No. 4,848,794 issued July 18, 1989 to Mader et al. In the Mader patent a safety belt connector fitting is disclosed in association with a three-point safety belt harness wherein the connector fitting is mounted on a mid-portion of the belt to be releasably anchored to an associated push button type buckle positioned inboard of the vehicle passenger seat. The slide bar of the connector fitting has a web spanning the belt receiving aperture of the fitting base plate for entraining the safety belt through the fitting. The web upper longitudinal corner surfaces which are truncated to provide flattened surfaces facilitating sliding movement of the belt thereby when the fitting is suspended on the belt in a stored condition. Lower longitudinally extending corners of the web have conventional right angle corner configurations to cinch the safety belt between the slide bar and the fitting base when the connector is in use to hold a passenger via lower portions of the safety belt in his vehicle seat in an emergency condition.

SUMMARY OF THE INVENTION

Accordingly, it is an object of the present invention to provide a novel and improved latchplate assembly for a three-point seat belt harness which has a free running mode when suspended on a seat belt in a stowed condition enabling it to adjust or "run" to a predetermined position on the belt and a cinching mode providing a snug latching position for securing the passenger into the seat.

The present invention provides a new and improved latchplate assembly including a steel latchplate, a steel J-shaped lock bar, and a plastic cover. The latchplate frame is formed with a pair of first and second slots located on each side of a center cross bar enabling the lock bar to be positioned on the cross bar in a rocking manner. The lock bar has a planar portion and an arcuate portion with the arcuate portion extending through the first slot allowing the seat belt to be weaved through the first slot and over the lock bar for exiting through the second slot.

In the latchplate's stowed free running mode the belt is straight allowing the lock bar to relax for sliding adjustment of the latchplate on the belt. A cinching mode is achieved by the user changing the path of the belt such that it passes around the lock bar arcuate portion and is pulled in a known cinching manner. This causes the lock bar to rock about a transverse camming axis whereby the free end of the lock bar planar portion pinches the belt against the edge of the second slot thereby latching the assembly.

BRIEF DESCRIPTION OF THE DRAWINGS

Other features and advantages of the invention, such as reduced number of parts and improved service disassembly, will be evident from the following detailed description of the preferred embodiment of the invention and the accompanying drawings wherein:

FIG. 5 is an enlarged top elevational view of the latchplate assembly with the plastic cover shown in phantom;

FIG. 6 is a fragmentary vertical sectional view taken on the line 6—6 of FIG. 5;

FIG. 7 is a detail plane view of the latchplate;

FIG. 8 is an enlarged fragmentary side elevational view, partly in section, of the latchplate assembly of FIG. 3;

FIG. 9 is a view similar to FIG. 8 showing the seat belt; and

FIG. 10 is a detail perspective view of the lock bar of FIG. 4 showing the underside thereof.

DETAILED DESCRIPTION OF THE PREFERRED EMBODIMENT

Figure 1:
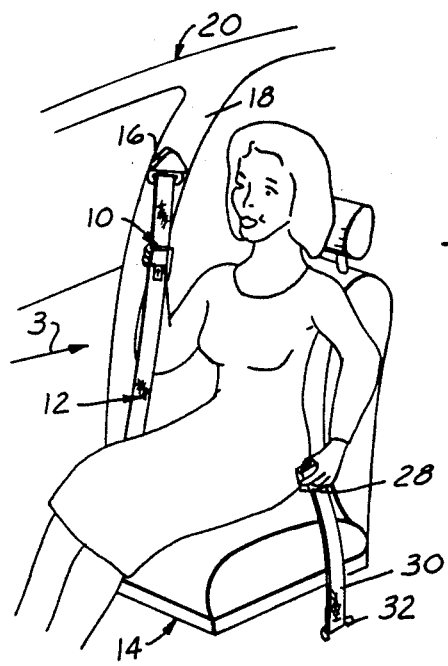
FIG. 1 is a depiction of a vehicle passenger seated in a vehicle front seat with a typical three-point safety belt harness installation for restraining the passenger in the seat, the harness including an exemplary embodiment of free running cinching connector for connecting the safety belt to the exemplary floor anchor connector in accordance with the present invention.

Turning now to FIG. 1 of the drawings the free falling latchplate is shown generally at 10 in association with a conventional three-point seat belt harness disclosed, for example, in the above mentioned U.S. Pat. No. 4,848,794. The harness includes a belt 12 anchored be a floor anchor adjacent the outboard side of vehicle seat cushion 14 and entrained by a conventional belt guide 16 attached to the B-pillar 18 of a vehicle frame 20. Reference may be made to U.S. Pat. No. 4,294,467 issued Oct. 13, 1981 to Frantom for details of a typical seat belt harness anchoring arrangement.

Figure 3:
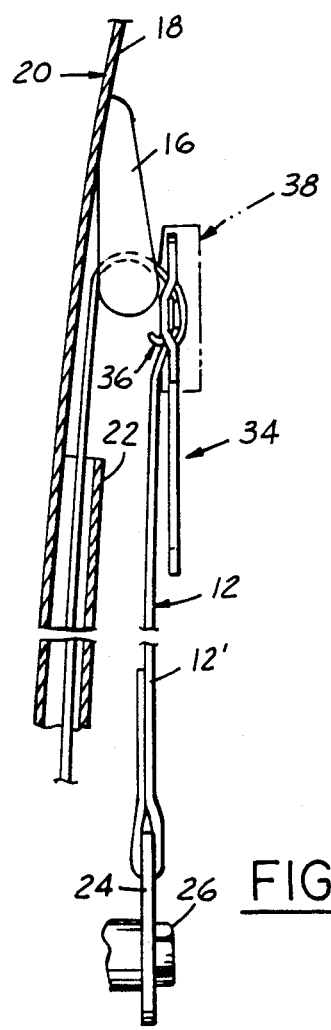
FIG. 3 is a fragmentary vertical side view, partly in section, of the latchplate assembly of FIG. 1.

As seen in FIG. 3 the belt 12 passes through the web guide 16 and into a B-pillar housing 22 to a conventional seat belt retractor (not shown) anchored to the vehicle frame. The other end of the belt 12 is anchored by end fitting 24 to the vehicle frame 20 by bolt 26 adjacent the vehicle floor.

Figure 2:
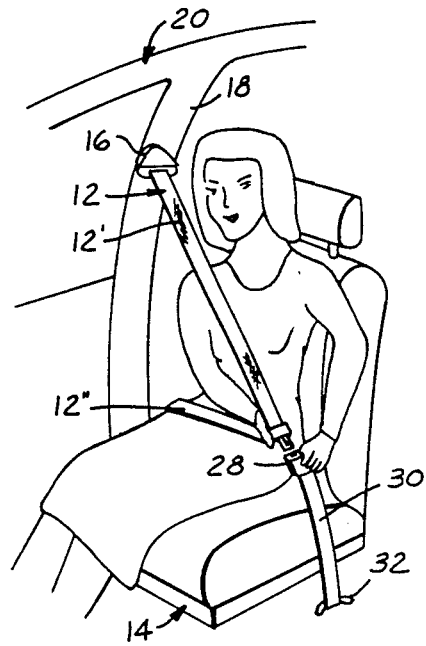
FIG. 2 is a view as in FIG. 1 showing the free running cinching latchplate assembly on a safety belt being assembled to the anchor adjacent the vehicle seat.

With reference to FIGS. 1 and 2 the inboard portion of the safety harness includes a seat belt buckle 28, such as a conventional push button buckle, which serves as a mating connector for the free falling cinching latchplate 10. The buckle 28 is mounted in a known manner to belt strap 30 which is shown fixed to a floor anchor 32 adjacent the inboard side of the vehicle seat cushion 14.

Figure 4:
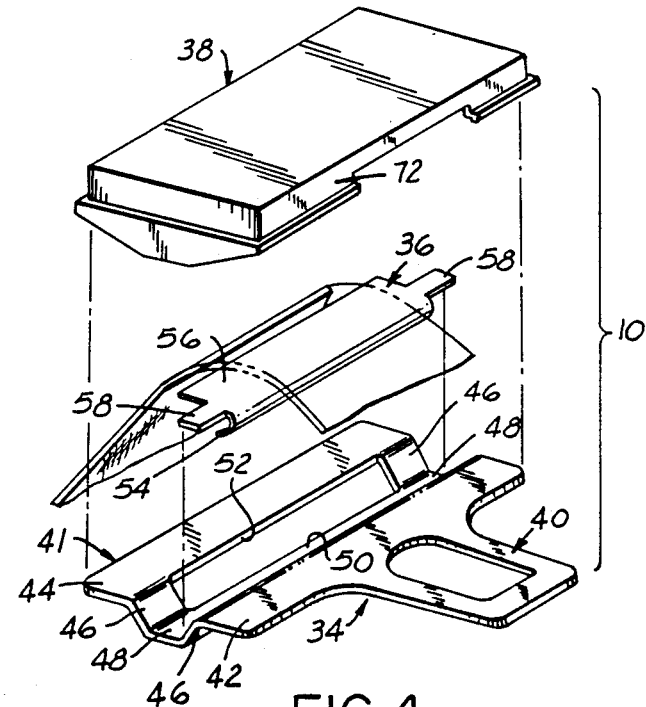
FIG. 4 is an exploded view of the latchplate assembly of FIGS. 1-3.

As best seen in the exploded view of FIG. 4, the free running or "free-falling" latchplate assembly 10 includes a latchplate 34, a lock bar 36, and a plastic cover 38. The latchplate 34 comprises at its forward end a tongue plate 40, adapted to be received and locked in a suitable buckle or connector 28, and a connector generally rectangular open frame 41. FIG. 7 shows the latch plate symmetrically disposed about longitudinal axis "X". The frame 42 is defined by a pair of co-planar longitudinally spaced transverse frame portions 42 and 44 interconnected by a pair of transversely spaced longitudinal trough-shaped frame portions.

The trough-shaped frame portions are each of generally U-shaped configuration defined by a pair of sloped legs 46 and a base or bight portion 48 extending therebetween with the bight 48 lying in a plane parallel to and spaced below the plane of frame portions 42 and 44. As best seen in FIG. 6, each pair of legs 46 diverge upwardly away from the bight 48 in a mirror image symmetrical manner. A transverse planar cross bar 50 interconnects the bights 48 so as to define with the frame 41 a pair of transverse elongated first 51 and second 52 belt slots, as best seen in FIG. 7, coextensive with the latchplate cross bar 50.

With reference to FIGS. 4, 6 and 10 the elongated lock bar 36 has a J-shaped cross section defining a forward half-round hook portion 54 and a trailing planar tail portion 56. The hook portion extends through the first slot 51 while the tail portion extends through the second slot 52.

The lock bar 36 is formed with a pair of tabs 58 extending laterally in opposite directions from each end of the tail portion 56 and are adapted to overlie in a spaced manner an associated bight portion 48 with the lock bar supported on the cross bar. It will be noted in FIG. 10 that the undersurface of the lock bar planar sector 56 is formed with a transversely extending elongated raised rib or cam 60 adapted for rocking engagement with the upper mating surface of the cross bar 50.

The lightweight plastic cover 38 is provided to enclose the upper portions of the latchplate 34. With reference to FIGS. 4, 8, and 9 the cover 38 is rectangular shaped and has side walls 70 and end walls 72. The inner surface of the end walls 72 are adapted to receive the latchplate frame outer edges in a releasable snap action manner to retain the cover thereon. The cover 38 is provided merely for appearance and serves no mechanical or structural function.

With the lock bar 36 in place on the cross bar 50 the belt 12 is weaved through the first slot 51 in the latchplate and thence over the lock bar tail portion 56 for exiting through the second belt slot 52. FIG. 3 shows the latchplate assembly 10 in its free running position wherein the lock bar 36 floats on the cross bar 50, i.e. the retracted seat belt 12 extends vertically and the lock bar 36 is "relaxed" thus allowing a passenger to slide the belt easily through the latchplate pair of slots 51 and 52.

FIG. 8 shows the latchplate assembly 10 in a precinching position wherein the belt 12 includes a shoulder portion 12' adapted to extend across the passengers torso and a lap portion 12" adapted to extend across the passengers lap regions. The tongue plate 40 is shown about to be inserted in the buckle 28. It will be noted that with the belt 12 in the FIG. 8 position the lap portion 12" is loosely wrapped around the lock bar hook portion 54. In such pre-cinching position the lock bar tail portion free gripper edge 80 is adjacent pinch edge 82 of second slot 52 prior to the lock bar being rocked about its raised rib cam 60.

Upon the passenger pulling tightly on the belt lap portion 12", as viewed in FIG. 9, the lock bar 36 is rocked about its rib cam 60 such that its gripper edge 80 locks or cinches the belt against the pinch edge 82 and providing the passenger with a sense of being "locked-in" the seat. It will be appreciated that the latchplate assembly maintains its free-running mode when it is released from the buckle 28 and is retracted to a stowed condition adjacent the B-pillar 18 as seen in FIG. 1.

While there is described above the principles of this invention in connection with a specific embodiment, it is to be clearly understood that this description is made only by way of example and not as a limitation to the scope of this invention.

What is claimed is:

1. In a three-point safety belt harness for retaining a vehicle passenger in his seat, said harness including a seat belt having one end wound upon a spring bias storage retractor and an opposite end connected to an anchor adjacent the passenger seat, a belt guide generally adjacent the shoulder of said passenger with said belt being entrained therethrough, a releasable connector anchored on an opposite side of said passenger and a mating latchplate assembly slidably mounted upon said belt for releasable connection to said connector, the improvement of said latchplate assembly comprising the provision of:

a generally planar latchplate in the form of a tongue plate extending longitudinally from a generally rectangular open frame, said tongue plate adapted to be received and locked in the connector, said frame defined by a pair of co-planar longitudinally spaced transverse frame portions and a pair of transversely spaced longitudinal frame portions:

each said longitudinal frame portion being of generally U-shaped configuration defined by a pair of sloped sides and a bight portion extending therebetween, each said bight portion lying in a plane parallel to and spaced below the plane of said transverse frame portions such that each pair of sides diverge upwardly away from each said bight portion in a mirror image manner;

a transverse planar cross bar interconnecting each said bight so as to define with said latchplate frame a pair of transverse elongated first and second belt slots coextensive with said cross bar;

an elongated lock bar having a J-shaped cross section defining a planar leg portion and an arcuate hook portion, said lock bar supported in a coextensive manner on said cross bar such that said hook portion extends through said first belt slot with said leg portion overlying said cross bar such that the free edge of said leg portion extends through said second belt slot, said leg portion formed with a transversely extending rib-like cam on its undersurface in rocking contact with the opposed upper face of said cross bar such that said lock bar is adapted to rock about a transverse axis;

a seat belt entering said first slot from below so as to pass around said lock bar hook portion and over said lock bar leg portion free edge for exiting through said second slot;

said latchplate assembly having a free running mode wherein said belt is substantially straight allowing said lock bar to float for sliding adjustment of said latchplate assembly on said belt; and said latchplate assembly having a cinching mode by the passenger changing the path of said belt by passing it around said lock bar hook portion and pulling thereon causing said lock bar to rock about said transverse axis and pinching said belt between said lock bar free edge and the opposed inner edge of its associated transverse frame portion.

* * * * *